United States Patent

[11] 3,579,122

[72] Inventors Thomas O. Paine
Administrator of the National Aeronautics and Space Administration with respect to an invention of;
Tage O. Anderson, Arcadia; William J. Hurd, La Canada, Calif.

[21] Appl. No. 887,701
[22] Filed Dec. 23, 1969
[45] Patented May 18, 1971

[54] DIGITAL FILTER FOR REDUCING SAMPLING JITTER IN DIGITAL CONTROL SYSTEMS
10 Claims, 12 Drawing Figs.

[52] U.S. Cl. .......... 328/167, 328/44, 307/207, 307/222
[51] Int. Cl. .......... H03k 21/18
[50] Field of Search .......... 328/44, 167, 133; 307/222, 207; 331/8

[56] References Cited
UNITED STATES PATENTS
3,290,611 12/1966 Horlacher et al. .......... 307/207X
3,312,903 4/1967 Webb .......... 328/133X
3,411,103 11/1968 Deman et al. .......... 331/8X
3,453,551 7/1969 Haberle .......... 328/44X

*Primary Examiner*—John S. Heyman
*Attorneys*—J. H. Warden, Paul F. McCaul and G. T. McCoy

ABSTRACT: A digital filter comprising two up-down counters A and B. Counter A which is responsive to a sampled input signal which is quantized into three levels ±1, −1 and 0, is incremented in response to each +1 input, decremented in response to each −1 input, and remains unchanged in response to a 0 input. Counter B, which includes N stages, is incremented at each sampling time when A is positive, decremented when A is negative and remains unchanged when A is zero. When B overflows in a positive direction A is decremented by one while a negative overflow of B results in A being incremented by one. The filter output is $+2^{1N}$ when A is positive, $-2^{1N}$ when A is negative and zero (0) when the count in A is zero.

INVENTORS
TAGE O. ANDERSON
WILLIAM J. HURD
BY
ATTORNEYS

FIG. 2a
| k | $INPUT_k$ | $A_k$ | $B_k$ | $OUTPUT_k$ |
|---|---|---|---|---|
| 0 | 0 | 0 | 0 | 0 |
| 1 | +1 | +1 | 0 | + |
| 2 | 0 | +1 | +1 | − |
| 3 | 0 | 1 | +2 | + |
| 4 | 0 | 1 | +3 | + |
| 5 | 0 | 0 | 0 | 0 |
| 6 | 0 | 0 | 0 | 0 |
| 7 | 0 | 0 | 0 | 0 |
FIG. 2b
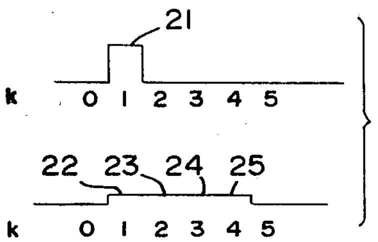
FIG. 3a
| k | $INPUT_k$ | $A_k$ | $B_k$ | $OUTPUT_k$ |
|---|---|---|---|---|
| 0 | 0 | 0 | 0 | 0 |
| 1 | −1 | −1 | 0 | − |
| 2 | 0 | 0 | 3 | 0 |
| 3 | +1 | +1 | 3 | + |
| 4 | 0 | 0 | 0 | 0 |
| 5 | 0 | 0 | 0 | 0 |
FIG. 3b
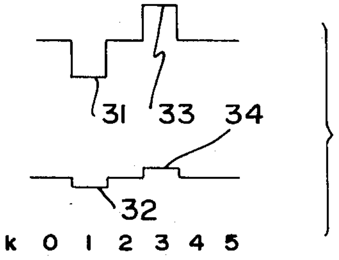
FIG. 4a
| k | $INPUT_k$ | $A_k$ | $B_k$ | $OUTPUT_k$ |
|---|---|---|---|---|
| 0 | 0 | 0 | 0 | 0 |
| 1 | −1 | −1 | 0 | − |
| 2 | 0 | 0 | 3 | 0 |
| 3 | 0 | 0 | 3 | 0 |
| 4 | 0 | 0 | 3 | 0 |
FIG. 4b
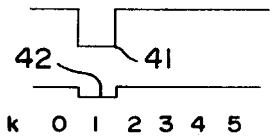
FIG. 5a
| k | $INPUT_k$ | $A_k$ | $B_k$ | $OUTPUT_k$ |
|---|---|---|---|---|
| 0 | 0 | 0 | 0 | 0 |
| 1 | +1 | +1 | 0 | + |
| 2 | 0 | +1 | 1 | + |
| 3 | 0 | +1 | 2 | + |
| 4 | −1 | 0 | 3 | 0 |
| 5 | 0 | 0 | 3 | 0 |
| 6 | 0 | 0 | 3 | 0 |
FIG. 5b
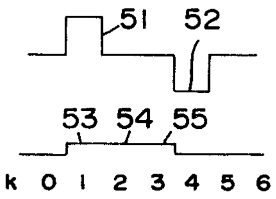
FIG. 8
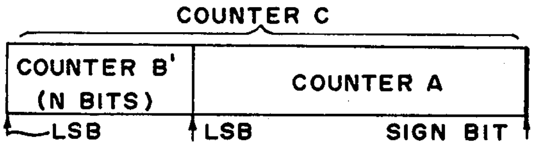
INVENTORS
TAGE O. ANDERSON
WILLIAM J. HURD
BY
ATTORNEYS

DIGITAL FILTER FOR REDUCING SAMPLING JITTER IN DIGITAL CONTROL SYSTEMS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to digital circuitry and, more particularly, to a nonlinear digital low-pass filter of the type useful for reducing sampling jitter in a digital control system.

2. Description of the Prior Art

In digital phase locked loops and other sampled data control systems, jitter on the reference or feedback signal is caused by the sampling and quantization processes. This jitter is quite disturbing since it can cause an undesirably large amount of phase jitter in the control signal. For example, in an application in which a phase locked loop is employed, the sampling and quantization may cause an undesirably large amount of phase jitter at the output of the voltage controlled oscillator (VCO).

There are two basic ways or methods of reducing sampling jitter to a tolerable level. One method requires the reduction of the loop bandwidth. However, narrow bandwidths cannot be used in may cases because of restrictions due to VCO instability, acquisition time, or frequency uncertainty. The second and preferred method of reducing sampling jitter is to employ a digital low-pass filter between the phase detector and the VCO in order to smooth the VCO input component, known as the proportional control, which is directly proportional to the phase detector output. This can be accomplished without significantly affecting the loop dynamics so long as the smoothing filter's bandwidth is wide compared with the loop bandwidth.

Although various digital filters have been designed and proposed for use in different digital systems, they are less useful than the current innovation in reducing sampling jitter in applications, as herebefore described. Furthermore, most digital filters are quite complex and expensive. For example, a conventional one pole linear digital filter requires an adder, several registers and in general at least one multiplier. A need therefore exists for a simple digital filter for use in reducing sampling jitter in a digital control system. Preferably such a filter should have an output with a maximum magnitude which is lower than the magnitude of the input by a constant factor, so that, in a phase locked loop application, the phase jitter in one sampling time is reduced by the same factor. Such a reduction in peak output amplitude is not realizable with a conventional linear digital filter.

OBJECTS AND SUMMARY OF THE INVENTION

It is a primary object of the present invention to provide a new digital filter.

Another object is to provide a simple digital filter which uses a minimum of circuitry and which finds particular application in the reduction of sampling jitter in a sampled data control system.

A further object of the present invention is to provide an essentially digital low-pass filter with an output whose maximum magnitude is lower than the magnitude of the filter's input by a constant factor which is dependent on the filter's equivalent bandwidth.

These and other objects of the invention are achieved by providing a filter which incorporates only two up-down counter and simple logic circuits. The two counters, designated A and B, are interconnected so that counter A keeps track of the integral of the filter input less the integral of the filter output except for some round off error, which may be present in some cases and which is accounted for by the count in counter B. Counter B controls the feedback from the output to the input of counter A by keeping track of the number of filter outputs. Assuming that counter B includes N stages and that the filter input is quantized to three levels$\pm$1, 0 and $-1$, the filter output is $+2^{1N}$, $-2^{1N}$ or 0 when the count in A is positive, negative or zero, respectively. When the value in A is positive or negative, counter B is incremented or decremented, at sample time respectively. Whenever counter B overflows in the up or down direction, counter A is incremented or decremented, respectively. Since counter B has N stages, the number of up overflows minus the number of down overflows is equal to $2^N$ times the number of positive filter outputs less $2^N$ times the number of negative filter outputs. Since the output amplitude is $\pm 2^{1N}$, the net effect of the feedback from counter B to counter A, up to any point in time, is equal to the integral of the output up to that time, except for a small round off error in counter B.

The novel features of the invention are set forth with particularity in the appended claims. The invention will best be understood from the following description when read in conjunction with the accompanying drawings.

BRIEF DESCRIPTION OF THE DRAWINGS

FIG. 2*a* and 2*b*, 3*a* and 3*b*, 4*a* and 4*b* and 5*a* and 5*b* are charts and waveform diagrams useful in explaining the operation of the filter in response to four different input sequences;

FIG. 8 is a simple diagram of a single counter useful in the mathematical description of the filter of the invention.

DESCRIPTION OF THE PREFERRED EMBODIMENTS

Figures 1, 6, 7:
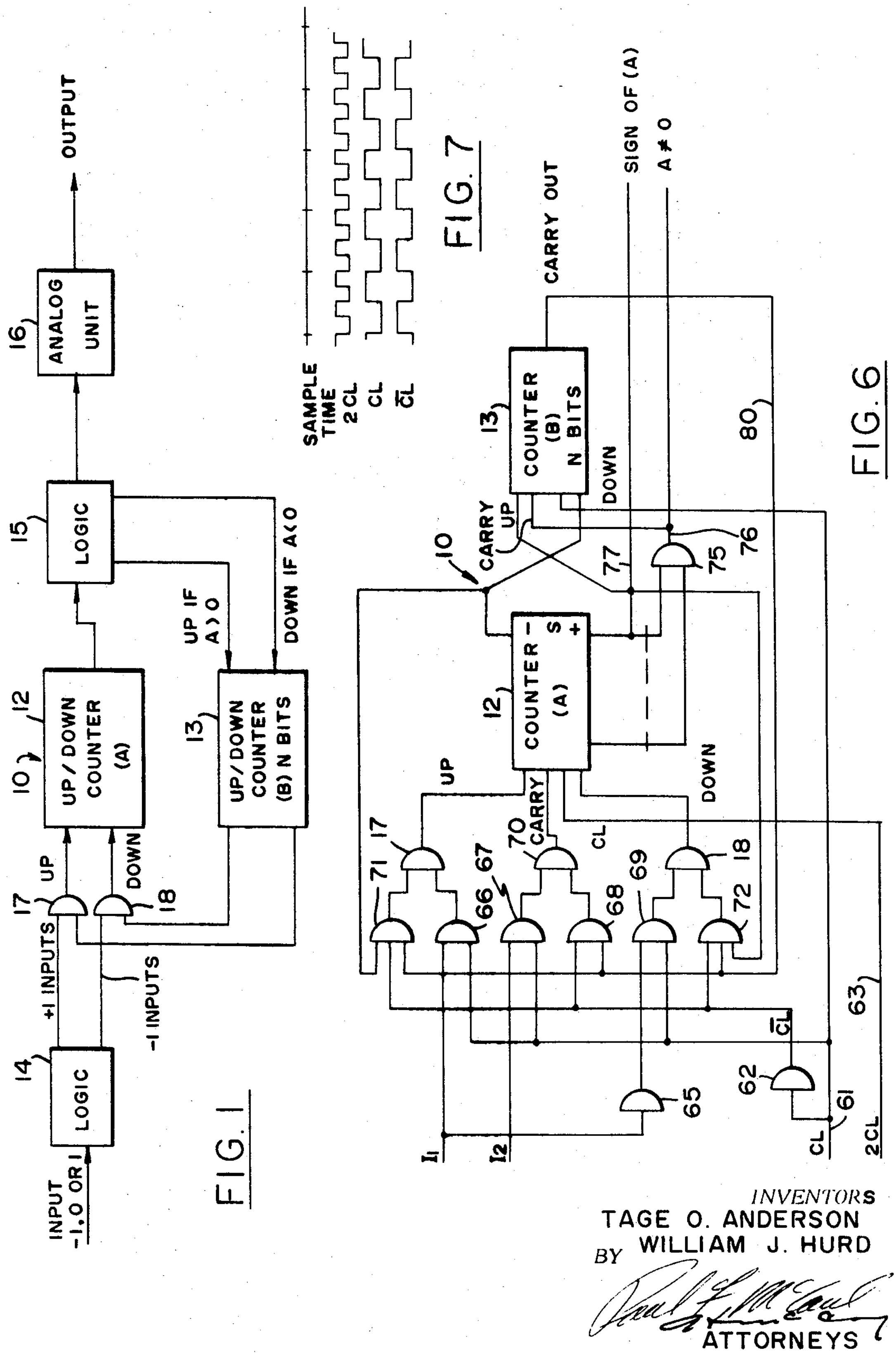
FIG. 1 is a functional block diagram of the filter of the present invention.
FIG. 6 is a detailed block diagram of the filter of the present invention.
FIG. 7 is a multiline diagram of clock waveforms.

The basic principles of operation of the novel filter of the present invention may best be explained in connection with the functional block diagram of FIG. 1. Therein, the filter 10 is shown including two up-down counters A and B, designated by blocks 12 and 13, respectively, an input logic unit 14 and an output logic unit 15. The latter is assumed to be connected to an analog unit 16 whose output amplitude is $2^{1N}$ when the count or value in A is positive, $-2^{1N}$ when the count in A is negative and 0 when the count in A is zero. Counter B is assumed to consist of N bits and the filter input is assumed to have +1, $-1$ or 0 units of amplitude.

In operation each +1 input increments counter A through unit 14 and gate 17, i.e., causes the counter to count up while each $-1$ input causes the counter to count down through unit 14 and a gate 18. A zero (0) input does not change the count in A. As long as A is positive, unit 16 provides a $+2^{1N}$ output, while a $-2^{1N}$ output is provided when A is negative. A zero output is provided when the count in A is zero.

During each sampling time the count in B is changed as a function of the count in A. In one embodiment, during each sampling time counter B is incremented when counter A is positive, decremented when counter A is negative, and is not changed when the count in A is zero. When counter B overflows in a positive direction it decrements counter A by means of gate 18. However, when counter B overflows in a negative direction it increments counter A by means of gate 17.

The operation of the filter may best be clarified by considering some input sequences and the resulting corresponding output sequences. FIG. 2*a* is a chart of the values in counters A and B for N=2, and the filter's input and output during a sequence of sampling times, [$k$] while FIG. 2*b* is a diagram of the input and output waveforms. Briefly, these FIGS. are used to described a sequence of one +1 input at $k$=1, followed by all 0 inputs.

It is assumed that at $k$=0 the input and output which are charted in the columns under the headings INPUT$_k$ and OUT- PUT$_k$, respectively are both zero (0) and that the counts or values in counters A and B, whose values are shown in the columns headed $A_k$ and $B_k$, respectively, are also zero (0). At $k$=1, a +1 input is assumed to be received. Consequently, counter A is incremented to hold a +1 and a positive output is produced by unit 16 (FIG. 1). This output is $+2^{1/N}32\ 2^{12}=$. Thus, as shown in FIG. 2*b* at $k$=1 in response to a positive input of +1 unit, as represented by an input pulse 21, an output pulse of one-fourth unit of amplitude, represented by numeral 22 is produced.

At $k$=2 the input becomes 0. However, since a +1 is stored in counter A, counter B counts up to store a 1. Since A stores a +1, a second output pulse is provided as represented by numeral 23. At each of $k$=3 and $k$=4, the input is 0. However, at each sample time, since a +1 is in counter A, counter B is incremented by 1 and an output is produced as represented by numerals 24 and 25. At $k$=5, counter B overflows from a count of 3 to a count of 0, or in the 2-bit counter from a maximum binary representation of 11 to a representation of 00. When this occurs counter A is decremented by 1 via gate 18 (see FIG. 1), so that the count in A becomes zero. Consequently, the output becomes 0.

From the foregoing it is thus seen that the novel filter of the present invention, in response to an input +1 of 1 unit amplitude, provides four outputs, each of one-fourth unit amplitude. Thus, the integral of the output is equal to the integral of the input, while the output amplitude is much smaller than the input amplitude. In fact, the output amplitude is lower than the input amplitude by $2^{1/N}$ which is a constant factor depending on the "equivalent bandwidth" of the filter, where the bandwidth depends on the number of stages of counter B, which is 2 in the foregoing example. It should be pointed out that in the particular example the filter delay is $2^N$ or four sampling times since the integral of the output becomes equal to the integral of the input after four sampling times.

Attention is now directed to three additional sequences of inputs. A sequence of a −1 followed by a +1 followed by all zeros is diagrammed in FIGS. 3*a* and 3*b*. A sequence of a −1 followed by all zeros is diagrammed in FIGS. 4*a* and 4*b*, while sequence of a +1 followed by a −1 within less than four sampling times is diagrammed in FIGS. 5*a* and 5*b*.

As diagrammed in FIGS. 3*a* and 3*b*, a −1 input pulse 31 is assumed to be received at $k$=1. Consequently, A is set to a −1 and a negative output pulse 32 is provided. At $k$=2 the input is assumed to be zero. Since A is negative the count in counter B is decremented by 1. Consequently, it changes from a 0 to a 3, which results in a negative overflow. As a result, counter A is incremented by 1, resulting in a value of 0 being stored therein. Consequently, the output becomes zero. At $k$=3, a +1 input is applied as represented by pulse 33. Consequently counter A is incremented and stores a +1 value, resulting in a positive output pulse 34. Then, at $k$=4, since A is positive, counter B is incremented from 3 to 0 resulting in a positive overflow. As a result, counter A is decremented to zero and therefore the output is zero.

By comparing the input and output waveforms in FIG. 3*b*, it is seen that the integral of the output which is zero is equal to the integral of the input. However, outputs of amplitudes which are much smaller than the amplitudes of the inputs are provided, thereby minimizing loop jitter. In this particular example of the input sequence, the filter's delay is actually zero.

In the two foregoing examples of input sequences, in which the last output, other than zero, is positive, i.e., $+2^{1/N}$, the output integral equals the input integral. In the next two examples of input sequences, the last output is a $-2^{1/N}$. As seen from FIGS. 4*a* and 4*b*, if a negative input of −1 which is designated by numeral 41 is received at $k$=1 followed by all zeros, a single output 42 of one-fourth amplitude is provided at $k$=1, followed by all zeros. Thus, the output integral differs from the input integral by three-fourths unit of amplitude, which represents less than one filter input. This represents a round off error which is accounted for by the count in counter B which is three (3).

Attention is now directed to FIGS. 5*a* and 5*b*. Therein, it is assumed that a +1 applied at $k$=1 and designated by numeral 51 is followed by a −1 at $k$=4, designated by pulse 52 which occurs before B overflows. In such a sequence the input integral is zero as represented by the sum of the areas of input pulses 51 and 52, while the integral of the output is +¾, due to the three ¼-output pulses 53, 54 and 55. Again, this represents a round off error which is accounted for by the count in counter B.

The novel filter of the present invention may thus be summarized as comprising two up-down counters A and B. B comprising N stages. The two are interconnected so that the number of up overflows of B minus the number of down overflows is equal to $2^N$ times the number of positive filter outputs less $2^N$ times the number of negative filter outputs. The filter's output is $+2^{1/N}$, 0 and $-2^{1/N}$ when A is positive, 0, or negative, respectively. The net effect of the feedback from counter B to counter A, up to any point in time, is equal to the integral of the output up to that time, except for a small round off error in counter B. Counter A thus keeps track of the integral of the filter input less the integral of the filter output except for the round off error, which is accounted for in counter B.

A peculiar feature of the filter of the present invention is that the delay in the filter depends on the sequence of the inputs. For example, if $k$ successive +1 inputs occur, beginning in the A=B=0 state, the integral of the output becomes exactly equal to the integral of the input after $2^N K$ sampling times. It should be noted that $k$ is a variable. This is in contrast with a linear one pole low-pass filter, for which the output decays exponentially with some fixed time constant. In some sense, the parameter $2^N$ in this filter can be thought of as being analogous in a general sense to the time constant in a linear filter.

Attention is now directed to FIG. 6 which is a detailed block diagram of the filter 10 shown in functional block form in FIG. 1. In FIG. 6 the various gates, which comprise logic units 14 and 15 are assumed to be NAND gates. The three possible inputs to the filter +1, −1 and 0 are represented by the logic states of input lines $I_1$ and $I_2$. The input is a 0 when $I_2$ is a logic 0 state or a 0, a +1 input is represented when both lines $I_1$ and $I_2$ are 1's while a −1 input is represented by $I_1$ and $I_2$ being at logic states of 0 and 1, respectively. Three square wave clocks are required. They include: (1) CL, which is at the sampling rate and in phase with the sample times, and which is applied at line 61, (2) $\overline{CL}$, the complement of CL, which is present at the output of gate 62, and (3) 2CL, a double rate clock on line 63. The waveshapes of these clocks with respect to sampling times are diagrammed in FIG. 7. Gates 65—70 represent input logic unit 14, while gates 71 and 72 form logic unit 15.

Counter A has four input signals which include the clock 2CL on line 63, a CARRY signal on the output line of gate 70, an UP enable or simply UP, represented by the output of gate 17 and a DOWN, represented by the output of gate 18. The counter counts up only if both the CARRY and the UP inputs are logically 1, while counting down when both the CARRY and the DOWN inputs are 1's. No change occurs if the CARRY input is 0. Counter B has four similar inputs. They include the clock CL on line 61, a CARRY input which is represented by the output of a gate 75 on line 76, which is a logic 1 only if the count in A is other than zero. The last bit of counter A which serves as a sign (s) bit provides the UP input of counter B on line 77 when the bit is positive (+), i.e., when the count in A is positive, the same bit provides the DOWN input of B when the bit is negative, i.e., when the count in A is negative. Lines 76 and 77 are supplied to the analog unit 16, which provides a 0 output when line 76 is a logic 0. However, if line 76 is a logic 1, unit 16 provides a $+2^{1/N}$ output if line 77 is a 1, while providing a $-2^{1/N}$ output when line 77 is a 0.

When 2CL and $I_2$ are both 1's, the CARRY input to counter A is a 1 and A counts UP or DOWN depending on whether $I_1$ is a 1 or 0, respectively. The actual count occurs when 2CL has a negative transition. Feedback counter B is controlled by the value in A and is clocked by CL. Counter B counts up if A>0 and counts down if A<0. If A=0 there is no carry into B so the count in B does not change.

Whenever B overflows which is represented by a logic 1 on its output line 80, A is incremented or decremented when $\overline{CL}$ is a 1. The direction of the overflow of B is determined by the sign bit of A. If the overflow is in response to a positive sign of A, representing a positive overflow gate 72 is activated providing a zero output to gate 18 so that counter A counts DOWN. On the other hand, if the overflow of B is due to a negative count in A, representing a negative overflow, gate 71 is enabled to provide a 0 output which causes gate 17 to provide an UP input to increment counter A. It should be pointed out the counter A limits at its full value and does not overflow whenever a long sequence of +1 or −1 inputs occurs.

It should be appreciated that modifications may be made in the embodiment of the invention herebefore described without departing from the spirit of the invention. For example, counter B may be made to count up or down in response to negative and positive counts in A. In such a case negative and positive overflows would result in decrementing and incrementing counter A, respectively.

The particular embodiment described herebefore may be described mathematically by considering counters A and B as comprising one longer register C as shown in FIG. 8. Essentially, B is appended to the least significant end of A, except that B', the 1's complement of B is used rather than B itself, as shown in FIG. 1, in order to conform to arbitrary sign conventions of the filter implementation.

Let $X_k$ and $Y_k$ be the input and output of the filter at time $k$, and let $C_k$ be the contents of the C register. The operation of the filter is then completely described by the two iterative equations:

$$Y_k = 2^{-N} \operatorname{sgn}([2^{-N} C_k])$$
$$C_{k+1} = C_k + X_{k+1} - 2^N Y_k$$

where $$\operatorname{sgn}(z) = \begin{cases} -1 & \text{if } z<0 \\ 0 & \text{if } z=0 \\ 1 & \text{if } z>0 \end{cases}$$

and $[z]$ denotes the greatest integer less than or equal to $z$.

Note that each input $X_k$ is either 1, 0 or −1, and that each output is either $2^{1.N}$, 0 or $-2^{1.N}$. The zero output occurs when $0 \leq C_k < 2^N$. To conform to the initial condition A=B=0 of the filter implementation, the initial value of C must be $2^N - 1$, i.e., A=0, B=0, but B', the 1's complement of B, is equal to $2^N - 1$.

Although particular embodiments of the invention have been described and illustrated herein, it is recognized that modifications and variations may readily occur to those skilled in the art and consequently it is intended that the claims be interpreted to cover such modifications and equivalents.

We claim:

1. A digital circuit comprising:

a first up-down counter;

a second up-down counter; and logic means for interconnecting said counters so that the count in said second counter is changed as a function of the count in said first counter and the count in said first counter is changed as a function of the overflow of said second counter.

2. The arrangement as recited in claim 1 wherein said second counter comprises an N-bit counter and said first counter is responsive to an input which is quantized to at least first and second levels and means for varying the count in said first counter in a first direction in response to a first level input and in a second direction in response to a second level input, and said logic means vary the count in said first direction when said second counter overflows in a first direction and vary the count in said counter in said second direction when said second counter overflows in a second direction.

3. The arrangement as recited in claim 1 wherein said logic means include means for incrementing the count in said second counter as long as the count in said first count differs from zero in a first direction, means for decrementing the count in said second counter when said count in said first counter differs from zero in a second direction, and said circuit further including means for decrementing the count in said first counter when said second counter overflows in a first direction and for incrementing the count in said first counter when said second counter overflows in a second direction.

4. The arrangement as recited in claim 3 wherein said first counter is responsive to an input which is quantized into at least first and second levels and said circuit includes means for incrementing the count in said first counter in response to a first level input and for decrementing the count in said first counter in response to a second level input.

5. The arrangement as recited in claim 4 wherein said second counter is incremented and decremented when the count in said first counter is positive and negative respectively with respect to a zero count and said first counter is decremented when said second counter overflows from a maximum count to a zero count and said first counter is incremented when said second counter overflows from a zero count to a maximum count.

6. The arrangement as recited in claim 5 wherein said first and second input levels represent positive and negative levels with respect to a zero level which represents a third input level and said circuit includes means for inhibiting said first counter from counting in either direction in response to a third level input.

7. The arrangement as recited in claim 6 wherein said second counter comprises an N-bit counter each of said first and second input levels being 1 amplitude unit, and said circuit further including means for providing an output having an amplitude which is $+2^{1.N}$, 0 or $-2^{1.N}$ when the count in said first counter is positive, 0, or negative, respectively.

8. The arrangement as recited in claim 4 wherein said second counter is incremented and decremented when the count in said first counter is negative and positive respectively with respect to zero, and said first counter is incremented and decremented when said second counter overflows from a maximum count to a zero count and from a zero count to a maximum count respectively.

9. The arrangement as recited in claim 8 wherein said first and second input levels represent positive and negative levels with respect to a zero level which represents a third input level and said circuit includes means for inhibiting said first counter from counting in either direction in response to a third level input.

10. The arrangement as recited in claim 9 wherein said second counter comprises an N-bit counter each of said first and second input levels being 1 amplitude unit, and said circuit further including means for providing an output having an amplitude which is $+2^{1.N}$, 0 or $-2^{1.N}$ when the count in said first counter is positive, 0, or negative, respectively.